United States Patent [19]

Kohara et al.

[11] Patent Number: 5,063,096

[45] Date of Patent: Nov. 5, 1991

[54] OPTICAL DISK

[75] Inventors: Teiji Kohara, Kawasaki; Masayoshi Oshima, Niiza; Tadao Natsuume, Yokosuka, all of Japan

[73] Assignee: Nippon Zeon Co., Ltd., Tokyo, Japan

[21] Appl. No.: 534,215

[22] Filed: Jun. 7, 1990

[30] Foreign Application Priority Data

Jun. 10, 1989 [JP] Japan ................................. 1-147299

[51] Int. Cl.$^5$ ............................................... B32B 3/02
[52] U.S. Cl. ....................................... 421/64; 428/65; 428/411.1; 428/457; 428/461; 428/913; 369/284; 369/286; 369/288; 346/766; 346/135.1; 430/945
[58] Field of Search ................ 428/64, 65, 411.1, 457, 428/461, 913; 369/284, 286, 288; 346/766, 135.1; 430/945

[56] References Cited

U.S. PATENT DOCUMENTS 4,868,261 9/1989 Kobayashi et al. .................. 526/282
4,948,856 8/1990 Minchak et al. ..................... 526/281

FOREIGN PATENT DOCUMENTS

| 303246 | 2/1989 | European Pat. Off. . |
| 317262 | 5/1989 | European Pat. Off. . |
| 60-26024 | 2/1985 | Japan . |
| 61-120816 | 6/1986 | Japan . |
| 62-60142 | 3/1987 | Japan . |
| 63-317520 | 12/1988 | Japan . |
| 1-24826 | 1/1989 | Japan . |

Primary Examiner—Patrick J. Ryan
Attorney, Agent, or Firm—Armstrong, Nikaido, Marmelstein, Kubovcik & Murray

[57] ABSTRACT

There is disclosed an optical disk having an optical reflectivity of 70% or above which comprises a substrate made of a thermoplastic saturated norbornene type polymer having a glass transition temperature of 100° C. or above and a light reflecting layer formed by laminating, on said substrate, a multi-layer film constituted of at least one compound selected from the group consisting of metallic oxides and metallic fluorides.

11 Claims, No Drawings

OPTICAL DISK

BACKGROUND OF THE INVENTION

1. Industrial Field of the Invention

This invention relates to an optical disk, and more particularly to an optical disk excellent in durability.

2. Related Art

In optical disks exclusively used for sound and/or picture reproducing, polycarbonate (PC) or polymethyl methacrylate (PMMA) has hitherto been used as a transparent substrate material, with vapor-deposited aluminum film as a reflecting layer.

The prior optical disks, however, have a problem that the reflecting aluminum film is susceptible to oxidation and hence its reflectivity decreases in the lapse of several years, until the disk becomes apt to cause insufficiency in reproducing ability.

It is known that an optical disk having a vapor deposited film of gold, resistant to oxidation, instead of aluminum film as reflecting layer is excellent in durability. However, vapor deposition of gold is industrially disadvantageous because the raw material is expensive.

As reflecting films for particular wavelength regions, multi-layer vapor deposition films of metallic oxide, metallic fluoride, metallic sulfide and the like are known. They are laminated on glass or PMMA substrate and used as an optical mirror, wavelength-selecting filter, or the like. Apart from the above, a method for preventing warpage of disk by providing a similar multi-layer vapor deposition film on PC substrate is also known (Japanese Patent Application Kokai (Laid-Open) No. 62-60142). These multi-layer vapor deposition films are superior in reflectivity to vapor deposition films of aluminum or gold, and are stable to oxidation. However, these films are disadvantageous in that they are inferior in adhesive property to PMMA and PC and poor in durability.

In Japanese Patent Application Kokai (Laid-Open) Nos. 60-26024, 61-120816, 63-317520, 1-24826, 1-132626 (EP 317262), EP 303,246 and U.S. Pat. No. 4,614,778, it is disclosed that thermoplastic saturated norbornene type polymers such as hydrogenated product of ring-opened polymer of norbornene type monomer and addition type copolymer of norbornene type monomer and ethylene have excellent characteristic features as optical disk substrate material. However, even if these polymers are used as substrate, the aluminum constituting the reflecting layer is still similarly susceptible to oxidative deterioration. Although vapor deposition of gold resistant to oxidation is practically performed, it is not advantageous industrially because of its expensiveness.

OBJECT AND SUMMARY OF THE INVENTION

It is an object of this invention to provide an optical disk excellent in durability.

It is another object of this invention to provide an optical disk having a reflecting layer excellent in adhesiveness to substrate and resistance to oxidative deterioration.

With the aim of solving the problem which the prior techniques have, the present inventors conducted many studies to find that metallic oxides and metallic fluorides exhibit a high adhesiveness to the above-mentioned thermoplastic norbornene type polymers. Based on this finding, this invention was accomplished.

According to this invention, there is provided an optical disk having an optical reflectivity of 70% or above which comprises a substrate made of a thermoplastic saturated norbornene type polymer having a glass transition temperature of 100° C. or above and a reflecting layer formed on said substrate by laminating a multi-layer film of at least one compound selected from the group consisting of metallic oxides and metallic fluorides.

DETAILED DESCRIPTION OF PREFERRED EMBODIMENTS

Hereunder, this invention will be explained in more detail.

NORBORNENE POLYMER

The thermoplastic saturated norbornene type polymer used in this invention is that having a glass transition temperature of 100° C. or above. As its specific examples, polymers having a structural unit represented by the following structural formula (I) and/or (II) can be referred to:

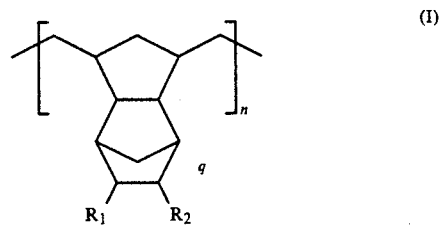

wherein $R_1$ and $R_2$ taken individually, identical or different each other, each represents hydrogen atom or nonpolar or polar substituent or $R_1$ and $R_2$ taken jointly form one ring in conjunction with each other, n represents a positive integer, and q represents O or a positive integer

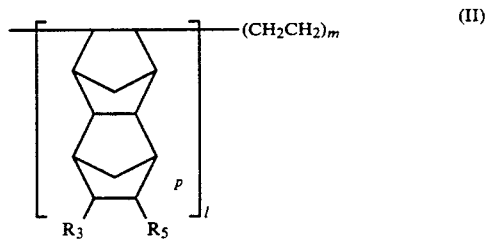

wherein $R_3$ and $R_4$ taken individually, identical or different each other, each represents hydrogen atom or nonpolar or polar substituent or $R_3$ and $R_4$ taken jointly form one ring in conjunction with each other, l and m each represents a positive integer, and p represents O or a positive integer.

The polymer having a structural unit represented by general formula (I) is a saturated polymer produced by subjecting a norbornene type monomer to known ring-opening polymerization to obtain a ring-opened polymer and hydrogenating the latter by the conventional hydrogenating process. Its specific examples include bicyclic monomers such as 2-norbornene, 5-methyl-2-norbornene, 5,6-dimethyl-2-norbornene, 5-ethyl-2-norbornene, 5-butyl-2-norbornene, 5-ethylidene-2-norbornene, 5-phenyl-2-norbornene, 5-cyclohexyl-2-norbornene, 5-cyano-2-norbornene, 5-methoxycarbonyl-2-norbornene, 5-acetoxy-2-norbornene, 5,6-dimethoxycarbonyl-2-norbornene, 5-chloro-2-norbornene, 5-methyl-5- methoxy-carbonyl-2-norbornene, 5-pyridyl-2-norbornene and the like; tricyclic monomers such as dicyclopentadiene, 2,3-dihydrodicyclopentadiene, and their alkyl (methyl, ethyl, propyl, butyl, etc.) substituted products and the like; tetracyclic monomers such as dimethano-octahydronaphthalene, 6-methyl-1,4:5,8-dimethano-1,4,4a,5,6,7,8,8a-octrahydronapthtalene, 6-ethyl-1,4:5,8-dimethano-1,4,4a,5,6,7,8,8a-octahydronaphthalene, 6-ethylidene-1,4:5,8-dimethano-1,4,4a,5,6,7,8,8a-octahydronaphthalene, 6-chloro-1,4:5,8-dimethano-1,4,4a,5,6,7,8,8a-octahydronaphthalene, 6-cyano-1,4:5,8-dimethano-1,4,4a,5,6,7,8,8a-octahydronaphthalene, 6-methoxycarbonyl-1,4:5,8-dimethano-1,4,4a,5,6,7,8,8a-octahydronaphthalene, 6-methyl-6-methoxycarbonyl-1,4:5,8-dimethano-1,4,4a,5,6,7,8,8a-octrahydronaphthalene, 6-methyl-6-cyano-1,4:5,8-dimethano-1,4,4a,5,6,7,8,8a-octahydronaphthalene, 6-pyridyl-1,4:5,8-dimethano-1,4,4a,5,6,7,8,8a-octahydronaphthalene and the like; and penta- or higher-cyclic monomers, for example, trimers and tetramers of cyclopentadiene such as 4,9:5,8-dimethano-3a,4,4a,5,8,8a,9,9a-octahydro-1H-benzoindene, 4,11:5,10:6,9-trimethano-3a,4,4a,5,5a,6,9,9a,10,10a,11,11a-dodecahydro-1H-cyclopentaanthracene and the like.

These monomers may be used either singly or in appropriate combination of two or more monomers. Since monomers having a polar substituent are inferior in moisture resistance, nonsubstituted monomers and substituted monomers of which substituent is a hydrocarbon residue such as alkyl or alkylidene group having 10 or less carbon atoms are preferred.

The polymer having the structural unit of general formula (II) is an addition polymerization type polymer obtained by copolymerizing the above-mentioned norbornene type monomer with ethylene according to known process and/or a hydrogenated product of said addition-polymerization type polymer. These polymers are all saturated polymers.

From the viewpoint of heat resistance, these polymers should have a glass transition temperature of 100° C. or above, preferably 120° C. to 200° C., and particularly preferably 130° C. to 180° C. Their molecular weight is 10,000 to 100,000 and preferably 20,000 to 50,000, as expressed in terms of number average molecular weight measured by GPC (gel permeation chromatography) using cyclohexane as a solvent. When the unsaturated bonds remaining in the molecular chain are saturated by hydrogenation, the extent of hydrogenation is 90% or above, preferably 95% or above, and particularly preferably 99% or above. Since they are saturated polymers, they are improved in resistances to weather and light.

The thermoplastic saturated norbornene type polymer of this invention may be a copolymer prepared by copolymerizing other monomer components such as alpha olefins, cycloolefins and the like in the course of production of polymers (I) and (II), unless the object of this invention is adversely affected by it.

Further, the above-mentioned saturated norbornene type polymers may be used in the form of a mixture of two or more members. Further, it may be used in mixture with other base materials for optical disk, unless the effect of this invention is essentially spoiled by it.

METALLIC OXIDE AND METALLIC FLUORIDE

The metallic oxide and/or metallic fluoride to be laminated on the surface of polymer substrate may be any metallic oxide or any metallic fluoride, so far as they are conventionally used as an optical reflecting film. Preferably, they should be stable in the usual atmospheric air and in water.

As examples of the metallic oxide and metallic fluoride, oxides and fluorides of the elements belonging to groups Ib, IIa, IIb, IIIa, IIIb, IVa, IVb, Vb, VIa, VIIa, VIII and lanthanide metals can be referred to. Specific examples of the metallic oxide include aluminum oxide, bismuth oxide, cerium oxide, chromium oxide, europium oxide, iron oxide, hafnium oxide, indium oxide, lanthanum oxide, molybdenum oxide, magnesium oxide, neodium oxide, lead oxide, praseodymium oxide, samarium oxide, antimony oxide, silicon oxide, silicon monoxide, scandium oxide, tin oxide, titanium oxide, titanium monoxide, dititanium trioxide, tantalum pentoxide, tungsten oxide, yttrium oxide, zirconium oxide, zinc oxide and the like.

Specific examples of the metallic fluoride include aluminum fluoride, barium fluoride, cerium fluoride, calcium fluoride, lanthanum fluoride, lithium fluoride, magnesium fluoride, cryolite, chiolite, neodymium fluoride, sodium fluoride, lead fluoride, samarium fluoride, strontium fluoride and the like.

In forming a reflecting layer, these metallic oxides and metallic fluorides are used in combination of two or more members different from one another in refractive index. Usually, an optical reflecting layer is formed by alternately superposing different layers, each layer having a thickness equal to $\frac{1}{4}$ of the prescribed wavelength to be reflected, so as to make many layers.

Although total thickness of multilayer and total number of layers are not critical, the total number of layers is usually 5 to 100, preferably 10 to 50, and the total thickness is 0.5 to 100 microns, preferably 1 to 10 microns. The total layer number is determined so that the optical reflectivity at the prescribed wavelength of optical disk, for example at 830 nm, 630 nm, etc., comes to 70% or above and preferably 90% or above.

The method for laminating the metallic oxide and/or metallic fluoride is not critical. Vapor deposition process, plating process and the like can be adopted successfully.

WORKING EXAMPLES

Next, this invention will be explained more concretely with reference to the following examples, reference example and comparative examples. This invention is by no means limited by these examples.

REFERENCE EXAMPLE

An optical disk substrate having a diameter of 13 cm and a thickness of 1.2 mm was prepared by injection molding a hydrogenated product of 6-methyl-1,4:5,8-dimethano-1,4,4a,5,6,7,8,8a-octahydronaphthalene (MTD) (molecular weight 28,000, extent of hydrogenation ca. 100%, glass transition temperature 152° C.).

EXAMPLE 1

The optical disk substrate prepared in Reference Example was washed in isopropyl alcohol by means of ultrasonic wave and then washed with vapor of Flon R-113. Onto the substrate, $TiO_2$ layer and $SiO_2$ layer (thickness of one layer was 830/4 nm) were alternately vapor-deposited under a vacuum of $10^{-5}$ Torr, so that total number of $TiO_2$ and $SiO_2$ layers came to 15. The total thickness of the deposited layers was 3 microns. The optical disk thus obtained had a reflectivity of 91% at 830 nm. Since the multi-layer thus formed transmitted visible light, the optical disk was excellent in transparency.

MEASUREMENT OF PROPERTIES

This optical disk was subjected to a heat cycle test under the following conditions: 60° C., 90% RH 30 minutes; −30° C., 100% RH for 30 minutes; 50 cycles in the total. Then appearance of optical disk, adhesiveness of vapor deposited film (evaluated by peeling test using adhesive tape) and its reflectivity at 830 nm were measured. The results are summarized in Table 1.

EXAMPLES 2 to 5

In the same manner as in Example 1, 15 layers of $CeO_2$ and $SiO_2$ (Example 2), 19 layers of $TiO_2$ and $Al_2O_3$ (Example 3), 15 layers of $TiO_2$ and $AlF_3$ (Example 4), and 21 layers of ZnO and $CaF_2$ (Example 5) were vapor-deposited onto an optical disk substrate prepared in Reference Example, so that total thickness of the vapor-deposited films came to about 3–4 microns in all the runs. Evaluation was carried out in the same manner as in Example 1.

COMPARATIVE EXAMPLE 1

Under the same conditions as in Example 1, 15 layers of $TiO_2$ and $SiO_2$ were vapor-deposited onto an optical disk substrate made of polymethyl methacrylate (Acripet VH, manufactured by Mitsubishi Rayon K. K.). Evaluation was carried out in the same manner as in Example 1.

COMPARATIVE EXAMPLE 2

Under the same conditions as in Example 1, 15 layers of $TiO_2$ and $SiO_2$ were vapor-deposited onto an optical substrate made of polycarbonate (Upilon H-4000, manufactured by Mitsubishi Gas Kagaku K. K.). Evaluation was carried out in the same manner as in Example 1.

COMPARATIVE EXAMPLE 3

According to the procedure of Example 1, Al was vapor-deposited onto an optical disk made of polycarbonate (the same polycarbonate as used in Comparative Example 2). Further, it was coated with a film of ultraviolet-curable resin composed mainly of trimethylolpropane triacrylate for the sake of protection. Then, evaluation was carried out in the same manner as in Example 1.

COMPARATIVE EXAMPLE 4

An optical disk having an Al reflecting film and a protecting film was prepared by repeating the procedure of Comparative Example 3, except that an optical disk substrate prepared in Reference Example was used. Evaluation was carried out in the same manner as in Example 1.

The results of Examples 1 to 5 and Comparative Examples 1 to 4 are summarized in Table 1.

TABLE 1

| | | Vapor-deposited substance | Reflecting at 830 nm (%) | | Appearance | Adhesiveness (Tape peeling test) |
|---|---|---|---|---|---|---|
| | | | Initial | After heat cycle test | | |
| Example | 1 | $TiO_2$—$SiO_2$ | 91 | 91 | No abnormality | No abnormality |
| | 2 | $CeO_2$—$SiO_2$ | 90 | 89 | No abnormality | No abnormality |
| | 3 | $TiO_2$—$Al_2O_3$ | 92 | 92 | No abnormality | No abnormality |
| | 4 | $TiO_2$—$AlF_3$ | 91 | 90 | No abnormality | No abnormality |
| | 5 | ZnO—$CaF_2$ | 90 | 91 | No abnormality | No abnormality |
| Comparative Example | 1 | $TiO_2$—$SiO_2$ | 92 | — | Whole peeling | — |
| | 2 | $TiO_2$—$SiO_2$ | 91 | — | Partial peeling | Partial peeling |
| | 3 | Al | 75 | — | Partial corrosion | — |
| | 4 | Al | 77 | — | Partial corrosion | — |

Note:
The symbol "—" means that no measurement or observation has been done due to the deterioration of the reflecting layer.

It is apparent from Table 1 that the optical disks of this invention are quite excellent in durability and industrially useful.

EXAMPLES 6 to 7

As optical disk substrate, (1) a hydrogenated product of a copolymer (molecular weight 27,000, glass transition temperature 133° C., extent of hydrogenation ca. 100%) prepared by a ring-opening copolymerization of a monomer mixture consisting of MTD and dicyclopentadiene (DCPD) (MTD/DCPD=70/30), and (2) an addition copolymer of MTD and ethylene (ethylene content 60% by mole, molecular weight 32,000, glass transition temperature 130° C.) were used. In the same manner as in Example 1, $TiO_2$ and $SiO_2$ were alternately vapor-deposited so as to form 15 layers. The optical disk thus obtained was evaluated in the same manner as in Example 1. In both the experiments, reflectivity at 830 nm was 91% both in the initial state and after heat recycle test. Appearance and adhesiveness were both good.

According to this invention, there can be obtained an optical disk superior to those of prior arts in durability of adhesiveness and optical reflectivity of reflecting film. Unlike the cases of using gold or aluminum as reflecting layer where no transparent disk can be obtained, this invention makes it possible to transmit visible light and reflect only a light of desired wavelength region by appropriately selecting film thickness. Thus, a transparent disk excellent in appearance can be obtained.

What is claimed is:

1. An optical disk having an optical reflectivity of 70% or above which comprises a substrate made of a thermoplastic saturated norbornene polymer having a glass transition temperature of 100° C. or above and a light reflecting layer formed by laminating, on said substrate, a multi-layer film constituted of at least one compound selected from the group consisting of metallic oxides and metallic fluorides.

2. An optical disk according to claim 1, wherein said polymer has a number average molecular weight of 10,000 to 100,000.

3. An optical disk according to claim 1, wherein said polymer is a hydrogenated product of a polymer prepared by ring-opening polymerization of a norbornene monomer.

4. An optical disk according to claim 3, wherein extent of hydrogenation of said hydrogenated product is 90% or above.

5. An optical disk according to claim 4, wherein said polymer is a polymer prepared by polymerizing a norbornene monomer which is either unsubstituted or substituted with a hydrocarbon group having 1 to 10 carbon atoms.

6. An optical disk according to claim 1, wherein said polymer is an addition polymer of a norbornene monomer or an addition polymer of said monomer and ethylene.

7. An optical disk according to claim 6, wherein said monomer is a norbornene monomer which is either unsubstituted or substituted with a hydrocarbon group having 1 to 10 carbon atoms.

8. An optical disk according to claim 5 or 7, wherein said optical reflectivity is 90% or above.

9. An optical disk according to claim 5 or 7, wherein said multi-layer has a thickness of 0.5 micron to 100 microns.

10. An optical disk according to claim 9, wherein said multi-layer has a thickness of 1 micron to 10 microns.

11. An optical disk according to claim 9, wherein said optical disk is a transparent optical disk.

* * * * *